(12) United States Patent
Inoue et al.

(10) Patent No.: US 7,623,779 B2
(45) Date of Patent: Nov. 24, 2009

(54) DISTANCE-MEASURING APPARATUS, DISTANCE-MEASURING METHOD, AND RECORDING MEDIUM

(75) Inventors: Hideaki Inoue, Musashimurayama (JP); Toshiharu Arai, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 381 days.

(21) Appl. No.: 11/521,191

(22) Filed: Sep. 14, 2006

(65) Prior Publication Data

US 2007/0071431 A1 Mar. 29, 2007

(30) Foreign Application Priority Data

Sep. 27, 2005 (JP) .............................. 2005-279455

(51) Int. Cl.
*G02B 7/28* (2006.01)
*G03B 13/20* (2006.01)
*G01C 3/08* (2006.01)

(52) U.S. Cl. ..................... 396/116; 396/121; 396/139; 356/4.01; 356/5.1

(58) Field of Classification Search .................. 396/51, 396/61, 65, 67, 94, 138, 373; 356/3
See application file for complete search history.

(56) References Cited

U.S. PATENT DOCUMENTS

| | | | | |
|---|---|---|---|---|
| 6,047,136 A | * | 4/2000 | Nakamura | 396/128 |
| 6,476,943 B1 | * | 11/2002 | Yertoprakhov | 359/15 |
| 7,092,045 B2 | * | 8/2006 | Haruna et al. | 348/745 |
| 7,252,388 B2 | * | 8/2007 | Ogawa | 353/70 |
| 2003/0193653 A1 | * | 10/2003 | Belliveau | 353/31 |
| 2004/0065853 A1 | * | 4/2004 | McQueen | 250/568 |
| 2005/0237492 A1 | * | 10/2005 | Shinozaki | 353/69 |
| 2006/0197921 A1 | | 9/2006 | Kurosu et al. | |
| 2006/0238773 A1 | * | 10/2006 | Wellstead et al. | 356/510 |
| 2006/0256299 A1 | | 11/2006 | Saito | |
| 2007/0071430 A1 | | 3/2007 | Iwanaga | |

FOREIGN PATENT DOCUMENTS

| | | |
|---|---|---|
| JP | 02-222806 A | 9/1990 |
| JP | 03-282392 A | 12/1991 |
| JP | 08-005342 A | 1/1996 |
| JP | 08-178648 A | 7/1996 |

(Continued)

OTHER PUBLICATIONS

Abramowitz et al. Right-Angle Prisms, http://web.archive.org/web/20020813184942/http://www.micro.magnet.fsu.edu/primer/java/prismsandbeamsplitters/rightangleprisms/index.html, 2002.*

(Continued)

*Primary Examiner*—WB Perkey
*Assistant Examiner*—Dennis Hancock
(74) *Attorney, Agent, or Firm*—Frishauf, Holtz, Goodman & Chick, P.C.

(57) ABSTRACT

A phase difference sensor is arranged toward a target object such that the sensor can rotate at least 180° on its sensor optical axis. As the phase difference sensor rotates, the angle of a sensor viewing field is changed, and the distance to the target object is correctly computed using results measured before and after the change in the angle.

16 Claims, 15 Drawing Sheets

FOREIGN PATENT DOCUMENTS

| | | | | |
|---|---|---|---|---|
| JP | 08178648 | A | * | 7/1996 |
| JP | 2003-207580 | A | | 7/2003 |
| JP | 2005-006228 | A | | 1/2005 |
| JP | 2005-061925 | A | | 3/2005 |
| JP | 2005-147959 | A | | 6/2005 |
| JP | 2005-227194 | A | | 8/2005 |
| JP | 2005227194 | A | * | 8/2005 |
| JP | 2005-307934 | A | | 11/2005 |

OTHER PUBLICATIONS

Precision Beam Splitters, http://web.archive.org/web/20050310131147/http://www.lightmachinery.com/precision-beam-splitters.html, 2005, LightMachinery.*

Module 6: Laser Distance Measurement, http://web.archive.org/web/20010223134555/http://cord.org/cm/leot/Module6/module6.htm, 2001, Cord.*

A Japanese Office Action (and English translation thereof) dated May 7, 2008, issued in a counterpart Japanese Application.

* cited by examiner

DISTANCE-MEASURING APPARATUS, DISTANCE-MEASURING METHOD, AND RECORDING MEDIUM

CROSS-REFERENCE TO RELATED APPLICATIONS

This application is based upon and claims the benefit of priority from prior Japanese Patent Application No. 2005-279455, filed Sep. 27, 2005, the entire contents of which are incorporated herein by reference.

BACKGROUND OF THE INVENTION

1. Field of the Invention

The present invention relates to a distance-measuring apparatus for measuring the distance to a target object using a phase difference sensor, a distance-measuring method, and a recording medium.

2. Description of the Related Art

When a projecting apparatus (projector) projects an image on a screen, the image might be distorted like a trapezoid depending on how the projector is disposed with respect to the screen.

As a method of correcting the distortion of a projected image automatically, the following is performed. The distance from a projection optical system to a screen is measured at three or more points. On the basis of a phase difference among the distances to the three points, the inclination angle of the projection plane of the screen is detected, and the distortion of an image projected on the plane is corrected (see Jpn. Pat. Appln. KOKAI Publication No. 2005-006228, for example).

Measuring the distance to a target object is called "distance measurement". Correcting the distortion of a projected image on the basis of the result of the distance measurement is called "trapezoid correction" because the image is distorted like a trapezoid.

A phase-difference sensor that is commonly used as a distance-measuring sensor in a projector and the like is sometimes changed in shape with time under the influence of ambient temperature, heat of a light source, etc. Though the change in shape is very small, it has a great influence on measurement precision because the size of the sensor itself is small.

A technique of reducing an error in measurement using a phase difference sensor in a prior art projector is disclosed in Jpn. Pat. Appln. KOKAI Publication No. 2005-061925.

Publication No. 2005-061925 discloses that a chart image (pattern image for distance measurement) is shifted a plurality of times and projected to measure the distance to a target object and the results of a plurality of measurements are averaged. However, the technique is a method of reducing an error by a plurality of measurements, and cannot cancel an error in measurement due to a change in the shape of the phase difference sensor itself.

Jpn. Pat. Appln. KOKAI Publication No. 2005-307934 discloses a camera using a phase difference sensor.

The camera of Publication No. 2005-307934 has a function of detecting an external factor in inhibiting measurement and a function of promoting the necessity of remeasurement. If an image is picked up with the phase difference sensor covered with an operator's finger, a warning is given to the operator. However, this warning shows only the incapability of measurement. As in the case of Publication No. 2005-061925, Publication No. 2005-307934 cannot cancel an error in measurement due to a change in the shape of the phase difference sensor itself.

As described above, a projector measures the distance to a screen at a plurality of points using a phase difference sensor and computes the inclination angle of the screen from distance data of these points. The inclination angle of the screen, for example, in the horizontal direction is computed by the ratio between the distances to right and left two points. However, due to variations in the characteristics of the phase difference sensor, the ratio comes to include an error as the phase difference sensor changes in shape with time. This error has an influence upon the detection of the inclination angle and consequently the reliability of trapezoid correction will be decreased.

BRIEF SUMMARY OF THE INVENTION

According to a first aspect of the present invention, there is provided a distance-measuring apparatus comprising a phase difference sensor which measures a distance to a target object using a phase difference system, a sensing range rotation unit which rotates a sensing range of the phase difference sensor by rotating the phase difference sensor on a sensor optical axis with the phase difference sensor facing the target object, and a computation unit which computes final distance data on a basis of measurement results obtained when the sensing range rotation unit sets the sensing range of the phase difference sensor at at least a first angle and a second angle formed by rotating the phase difference sensor 180° from the first angle.

According to a second aspect of the present invention, there is provided a distance-measuring method comprising performing a first measurement process of measuring a distance to a target object using a phase difference sensor by a phase difference system, rotating a sensing range of the phase difference sensor, performing a second measurement process of measuring a distance to a target object using the phase difference sensor after the sensing range is rotated, and computing final distance data on a basis of a measurement result obtained in the first measurement process and a measurement result obtained in the second measurement process.

According to a third aspect of the present invention, there is provided a computer-readable recording medium on which programs are recorded, the programs causing a computer to perform a first measurement function of measuring a distance to a target object using a phase difference sensor by a phase difference system, a rotation function of rotating a sensing range of the phase difference sensor, a second measurement function of measuring a distance to a target object using the phase difference sensor after the sensing range is rotated by the rotation function, and a computation function of computing final distance data on a basis of a measurement result obtained by the first measurement function and a measurement result obtained by the second measurement function.

DESCRIPTION OF THE PREFERRED EMBODIMENT

A distance-measuring apparatus according to each of first to third embodiments of the present invention will be described with reference to the accompanying drawings. In the embodiments, the distance-measuring apparatus is applied to a projecting apparatus (referred to as a projector hereinafter).

First Embodiment

The projector of the first embodiment includes a phase difference sensor. The phase difference sensor rotates on its sensor optical axis while facing a target object, the sensing range of the sensor, the viewing angle of the sensor is changed, and the final distance is computed using the results of measurement obtained before and after the change in the viewing angle. The sensor optical axis means a straight line extending from the center of the phase difference sensor in a direction perpendicular to a line of photodetectors of the sensor. The viewing angle means the inclination angle of a measurement range that varies as the phase difference sensor rotates on the sensor optical axis while facing a target object.

Figure 1:
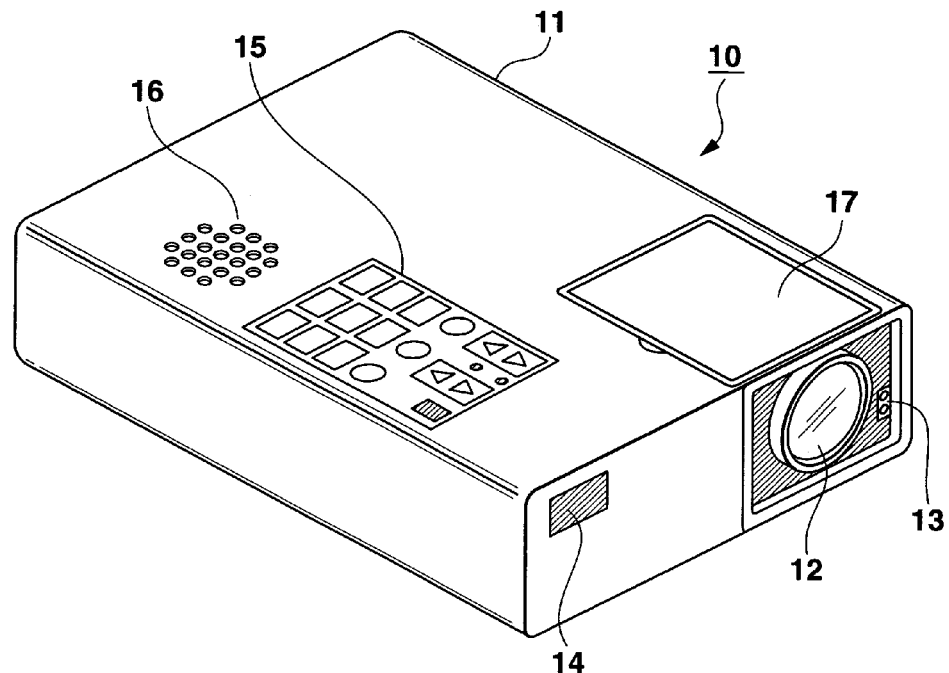
FIG. 1 is a perspective view of a distance-measuring apparatus according to a first embodiment of the present invention, which is applied to a projector, the projector being viewed from above.
Figure 2:
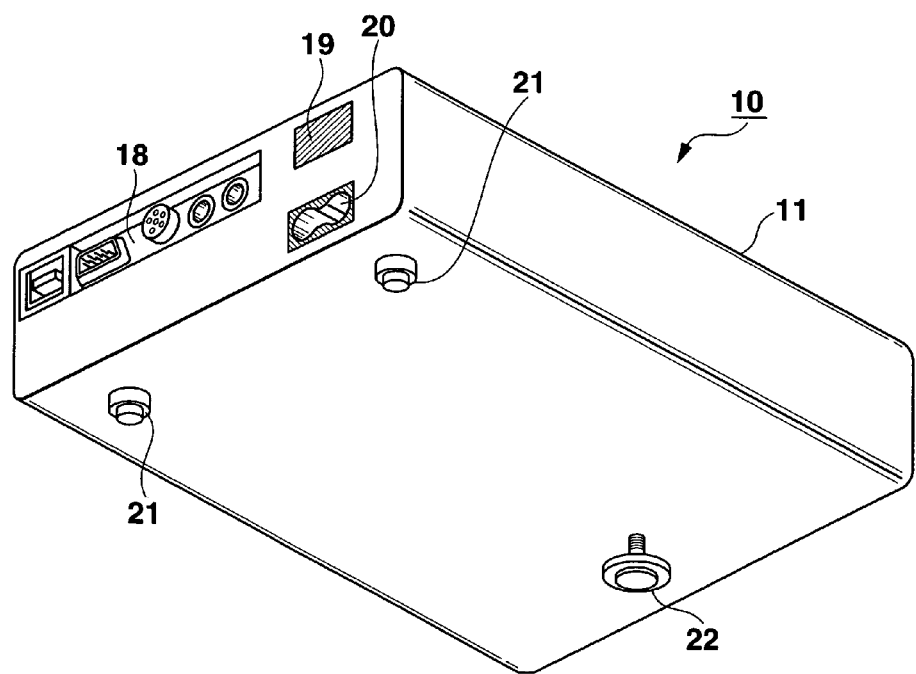
FIG. 2 is a perspective view of the projector according to the first embodiment of the present invention, the projector being viewed from below.

FIGS. 1 and 2 are perspective views of a projector 10 to which the distance-measuring apparatus according to the first embodiment of the present invention is applied. Of these figures, FIG. 1 shows the projector 10 viewed from above and FIG. 2 shows the projector 10 viewed from below.

The projector 10 includes a rectangular-parallelepiped main casing 11, a projector lens 12 provided on the front of the main casing 11, a phase difference sensor 13 and an IR receiving unit 14, as shown in FIG. 1.

The projector lens 12 projects an optical image that is formed by a spatial optical modulator such as a micro mirror element (described later). The focal position and zoom position (angle of view) of the projector lens 12 can freely be varied. The phase difference sensor 13 measures the distance to a target object and, more specifically, the distance to the plane on which an image is projected, on the basis of the principle of triangular distance measurement. The structure of the phase difference sensor 13 will be described in detail later.

The IR receiving unit 14 receives infrared light on which a keying signal is superposed from a remote control (not shown) of the projector 10.

On the top of the main casing 11, a main key/indicator 15, a speaker 16 and a cover 17 are arranged.

The main key/indicator 15 includes operation keys such as a power key, a zoom key and a focus key and indicators for displaying the ON/OFF state of a power supply, the temperature of a light source, and the like. The speaker 16 loudly outputs voices when moving images are played back. The cover 17 is opened and closed when a sub-key (not shown) is operated. With the sub-key, the operations that cannot be set by the keys of the main key/indicator 15 can be performed without using the remote control of the projector 10.

On the back of the main casing 11, an input/output connector 18, an IR receiving unit 19 and an AC adapter connecting section 20 are arranged as shown in FIG. 2.

The input/output connector 18 includes a USB terminal for connecting the projector 10 to an external device such as a personal computer, a mini D-SUB terminal, an S terminal and an RCA terminal for inputting video signals, and a stereo mini terminal for inputting voice signals. Like the IR receiving unit 14, the IR receiving unit 19 receives infrared light on which a keying signal is superposed from the remote control. The AC adapter connecting section 20 is used to connect a cable of an AC adapter (not shown) serving as a power supply.

A pair of fixing legs 21 is attached to the undersurface of the main casing 11 and close to the back thereof, and a height-adjustable leg 22 is attached to the undersurface of the main casing 11 and close to the front thereof. Screwing the leg 22 manually, a component in a direction perpendicular to the projecting direction of the projector lens 12, namely an angle of elevation is adjusted.

Figure 3:
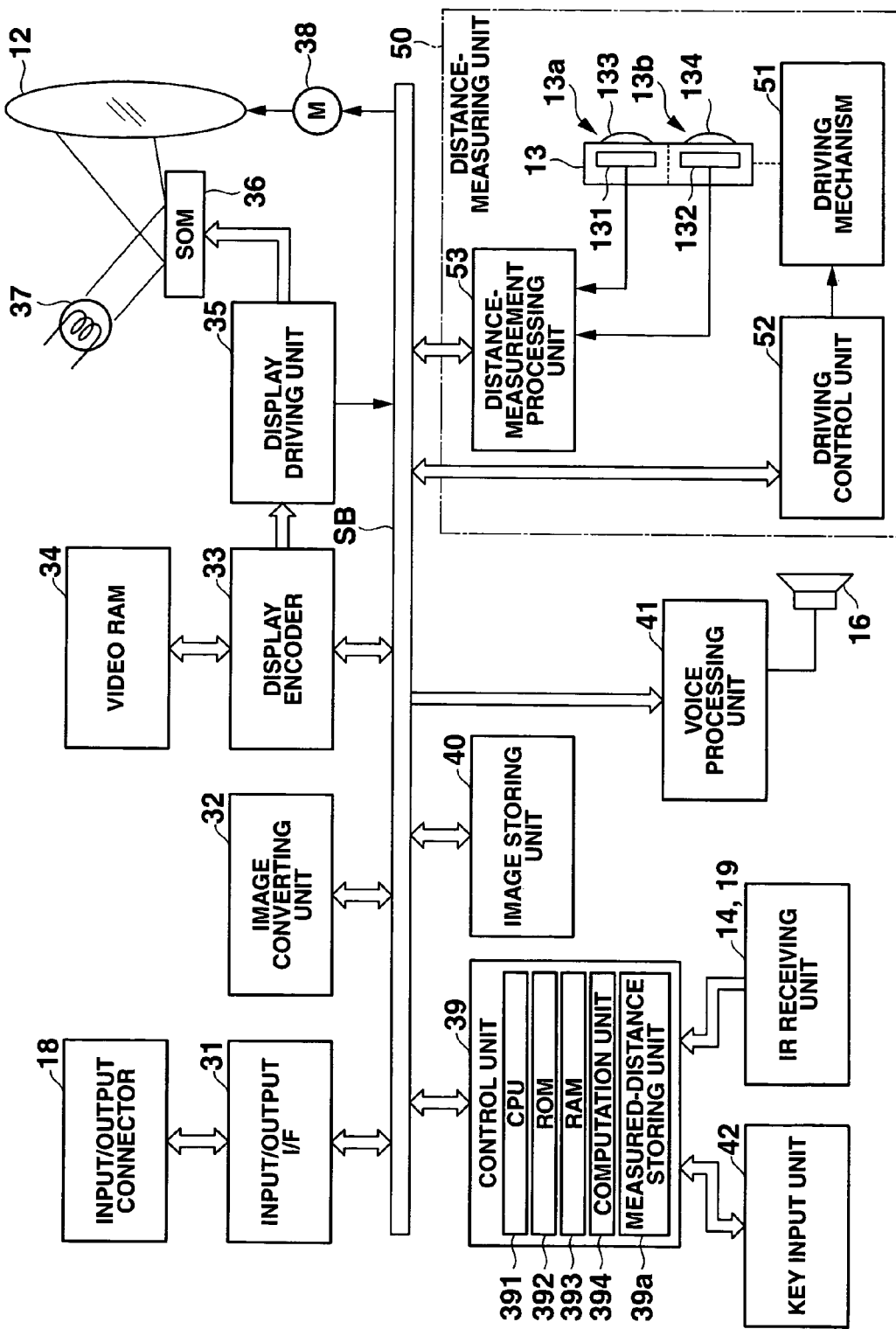
FIG. 3 is a block diagram of the arrangement of an electronic circuit of the projector according to the first embodiment of the present invention.

FIG. 3 is a block diagram of an electronic circuit of the projector 10. As shown in FIG. 3, the input/output connector 18 receives image signals of different formats and supplies them to an image converting unit 32 via an input/output interface (I/F) 31 and a system bus SB. The unit 32 converts the image signals into an image signal of a given format and sends it to a display encoder 33.

The display encoder 33 causes the image signal to be expanded and stored in a video RAM 34. Then, the encoder 33 generates a video signal from the contents stored in the video RAM 34 and supplies it to a display driving unit 35.

The display driving unit 35 drives a spatial optical modulator (SOM) 36 at an appropriate frame rate corresponding to the video signal, e.g., a frame rate of 30 frames per second. The spatial optical modulator 36 is irradiated with high-luminance white light from a light source lamp 37 such as an extra-high voltage mercury lamp to thereby form an optical image. The optical image is then projected on a screen (not shown) through the projector lens 12. The projector lens 12 is driven by a lens motor (M) 38 to shift its zoom position and focus position appropriately.

It is a control unit 39 that controls the operations of all of the circuit components described above. The control unit 39 is a microcomputer and includes a CPU 391, a ROM 392 that fixedly stores operation programs to be executed by the CPU 391, a RAM 393 used as a work memory and a computation unit 394 for computing the final distance data from two distance measurements.

An image storing unit 40 and a voice processing unit 41 are connected to the control unit 39 via the system bus SB.

The image storing unit 40 is, for example, a flash memory and stores image data such as a distance-measuring chart image (horizontal chart image and vertical chart image) and a user logo image. The image data is sent to the display encoder 33 and projected on the screen through the projector lens 12.

The voice processing unit 41 includes a sound source circuit such as a PCM sound source. The unit 41 converts voice data, which is provided when the image data is projected, into analog data and drives the speaker 16 to output the analog data loudly.

The main key/indicator 15 and the sub-key (not shown) in the cover 17 compose a key input unit 42. The key input unit 42 supplies a keying signal of the main key/indicator 15 directly to the control unit 39. The IR receiving units 14 and 19 receive an infrared light signal and supply the signal directly to the control unit 39.

The projector 10 also includes a distance-measuring unit 50. The distance-measuring unit 50 has the phase difference sensor 13, a driving mechanism 51, a driving control unit 52 and a distance-measurement processing unit 53.

The phase difference sensor 13 includes a pair of photodetectors 13a and 13b arranged in line to detect the distance to a target object using a phase difference system. The photodetectors 13a and 13b have photosensor arrays 131 and 132 and lenses 133 and 134, respectively. The lenses 133 and 134 are provided in front of and in parallel with the photosensor arrays 131 and 132. The lenses 133 and 134 are designed to form an image of a target object on the sensing planes of the photosensor arrays 131 and 132. The photosensor arrays 131 and 132 sense the image of the target object and output it as an electrical signal. The target object is an image that is projected on the screen.

The phase difference sensor 13 is arranged longitudinally or transversally on the front of the main casing 11. The phrase "arranged longitudinally" means that the photodetectors 13a and 13b incorporated in the phase difference sensor 13 are arranged in a longitudinal direction, or the direction of arrangement of the photodetectors (sensor arrangement direction) is a vertical direction. In contrast, a phrase "arranged transversally" means that the photodetectors 13a and 13b are arranged in a transversal direction, or the sensor arrangement direction is a horizontal direction.

In the example shown in FIG. 1, the phase difference sensor 13 is arranged longitudinally. However, the present invention is not particularly limited to this arrangement.

The driving mechanism 51 is used as a sensing range rotation unit for changing the viewing angle of the phase difference sensor 13. The driving mechanism 51 supports the phase difference sensor 13 such that the sensor 13 faces a target object and rotates at least 180° on the sensor optical axis. More specifically, the driving mechanism 51 includes a motor, a worm gear coupled to the shaft of the motor and a link gear engaged with the worm gear to rotate the phase difference sensor 13. As the motor rotates, the phase difference sensor 13 rotates on the sensor optical axis.

The driving control unit 52 drives the driving mechanism 51 under the control of the control unit 39. The distance-measurement processing unit 53 measures the distance to a target object using the phase difference sensor 13.

Figure 4:
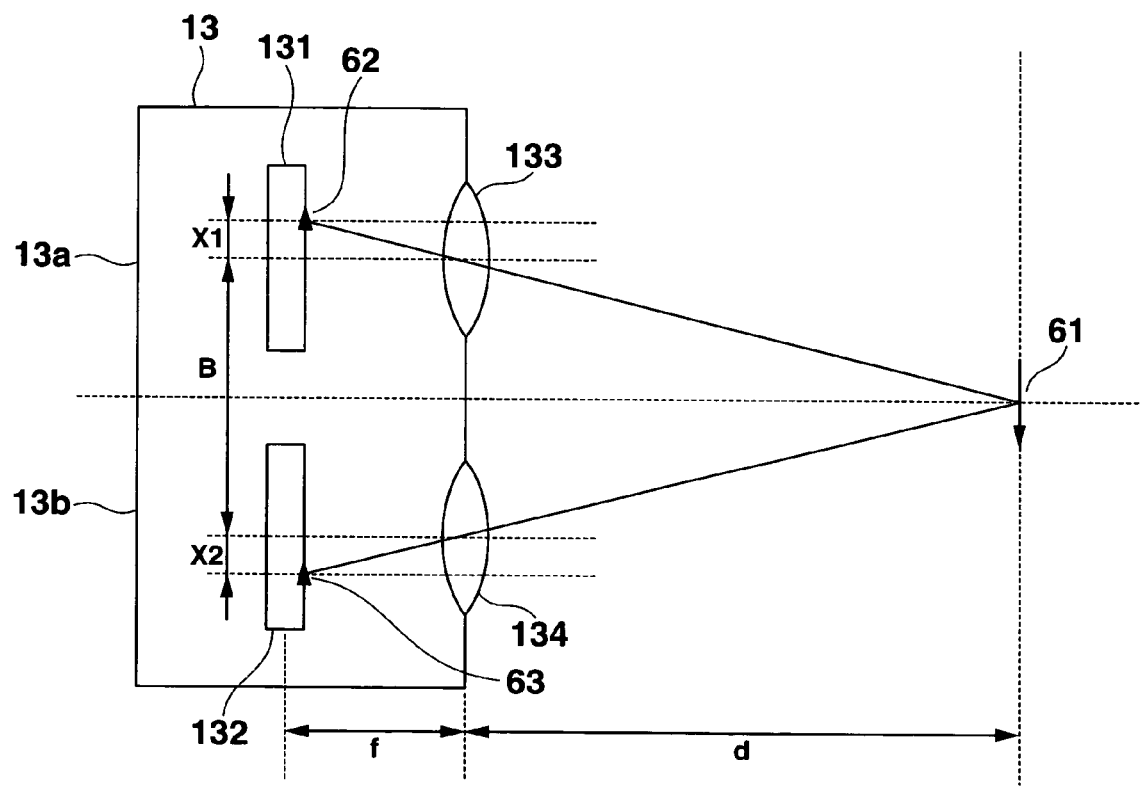
FIG. 4 is an illustration of a distance-measuring method using a phase difference sensor in the projector according to the first embodiment of the present invention.
Figure 5:
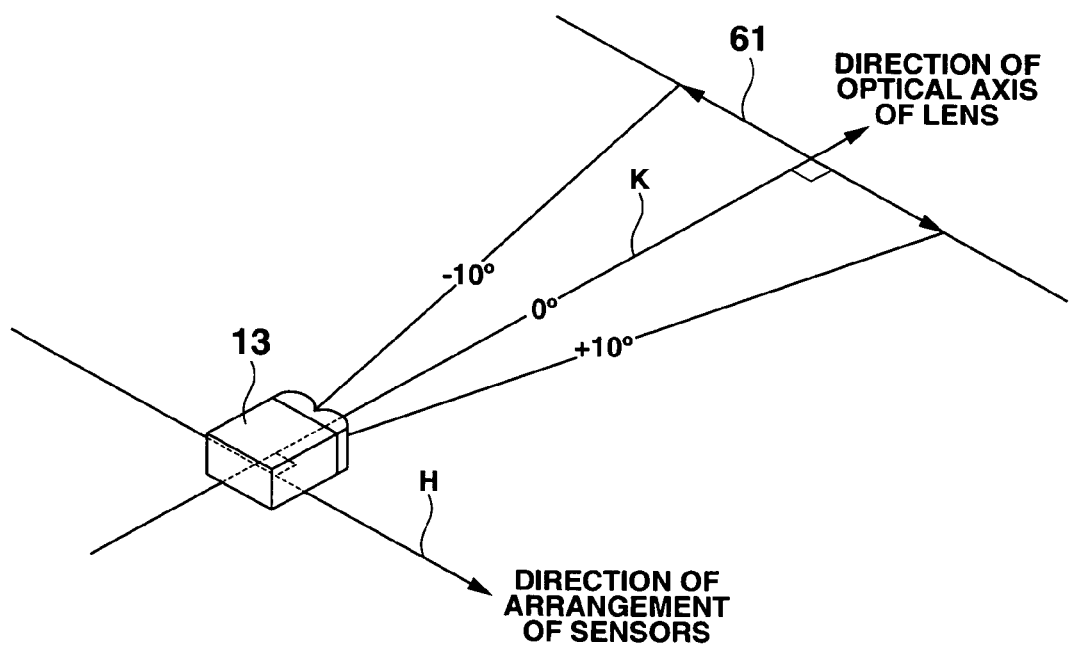
FIG. 5 is an illustration of a multi-point distance-measuring function of the phase difference sensor in the projector according to the first embodiment of the present invention.
Figure 6:
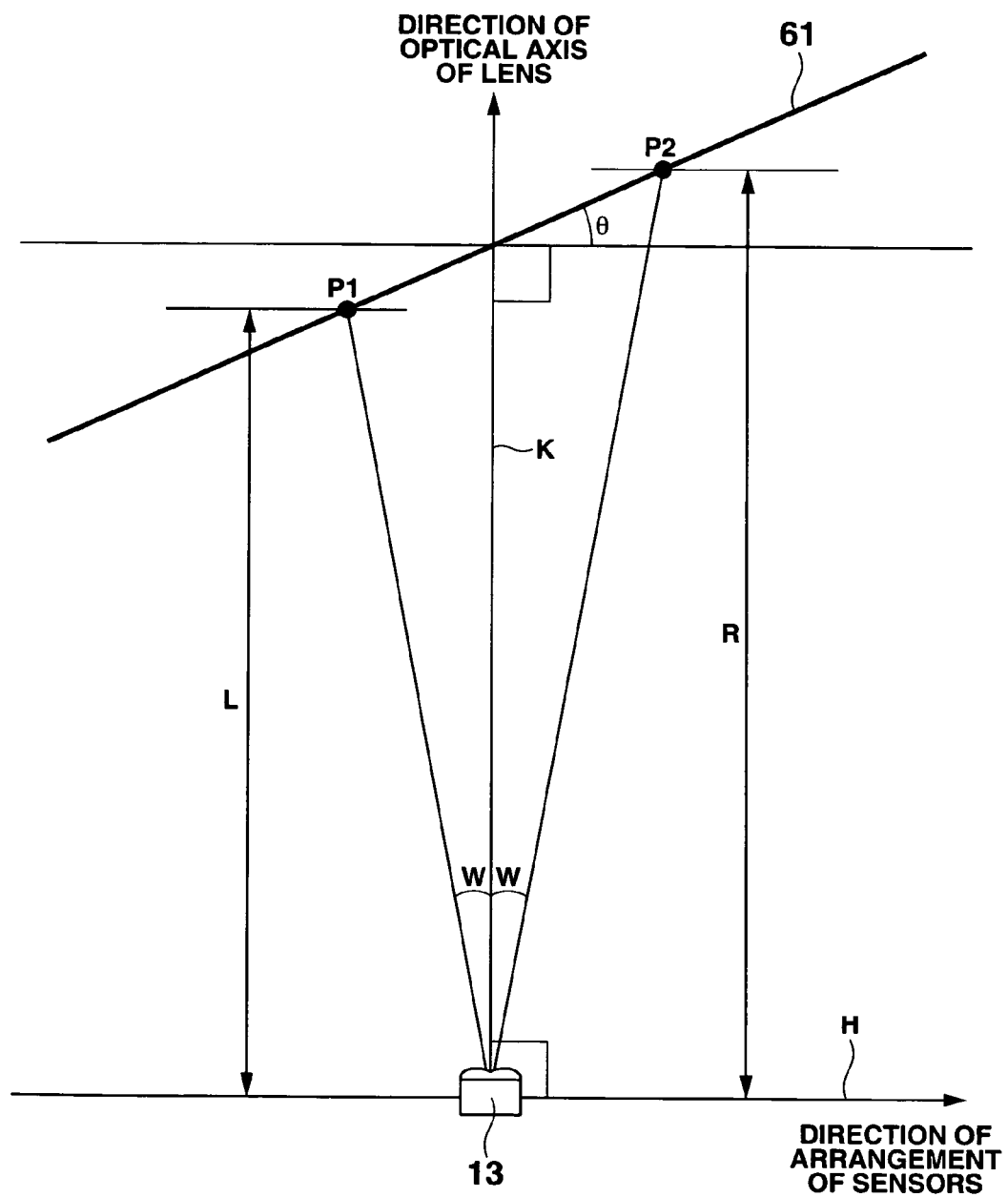
FIG. 6 is an illustration of a method of computing an inclination angle by the phase difference sensor in the projector according to the first embodiment of the present invention.

For easy understanding of the present invention, a distance-measuring method using a phase difference system will be described with reference to FIGS. 4 to 6. FIG. 4 is an illustration of a distance-measuring method using the phase difference sensor, FIG. 5 is an illustration of a multi-point distance-measuring function of the phase difference sensor, and FIG. 6 is an illustration of a method of computing an inclination angle by the phase difference sensor.

As shown in FIG. 4, when the distance to a target object 61 is measured, the target object 61 is irradiated with light from an emitting unit (not shown). The light reflected by the target object 61 is transmitted through the lens 133 and its image is formed on the photosensor array 131. The reflected light is also transmitted through the lens 134 and its image is formed on the photosensor array 132. In FIG. 4, reference numerals 62 and 63 indicate the image forming portions of the photosensor arrays 131 and 132.

Assume that the distance between the optical axis of the lens 133 and the image forming portion 62 is X1 and the distance between the center of the lens 134 and the image forming portion 63 is X2, the distance between the lenses 133 and 134 is B, and the distance of each of the photosensor arrays 131 and 132 and each of the lenses 133 and 134 is f. The distance d to the target object 61 is given by the following equation (1):

$$d = B * f/(x1+x2) \tag{1}$$

In the equation (1), the distance B and the distance f are each proper to the phase difference sensor 13. The distance d is therefore obtained by the phases (x1, x2) of the photosensor arrays 131 and 132.

As shown in FIG. 5, the phase difference sensor 13 is capable of measuring the distance to the target object 61 within a range of about ±10 degrees toward the sensor arrangement direction of the photodetectors 13a and 13b from the direction of optical axis K of the sensor 13. This is a multi-point distance-measuring function.

Referring to FIG. 6, the projector 10 acquires distance data of plural directions using the multi-point distance-measuring function of the phase difference sensor 13 and computes an inclination angle θ of the target object 61 (screen) to the sensor arrangement direction H on the basis of the distance data. Assuming now that the distances to two measurement points P1 and P2 in the direction of optical axis K of the sensor 13 are L and R, and the inclination of the optical axis K is ±W, the inclination angle θ of the target object 61 is expressed by the following equation (2):

$$\theta = \tan^{-1}\left(\frac{R-L}{R+L}\cot W\right) \quad (2)$$

$$= \tan^{-1}\left(\frac{1-\frac{L}{R}}{1+\frac{L}{R}}\cot W\right)$$

$$= \tan^{-1}\left(\frac{1-S}{1+S}\cot W\right)$$

where $S = \frac{L}{R}$

A distance-measuring method according to the first embodiment of the present invention will be described.

Figure 7:
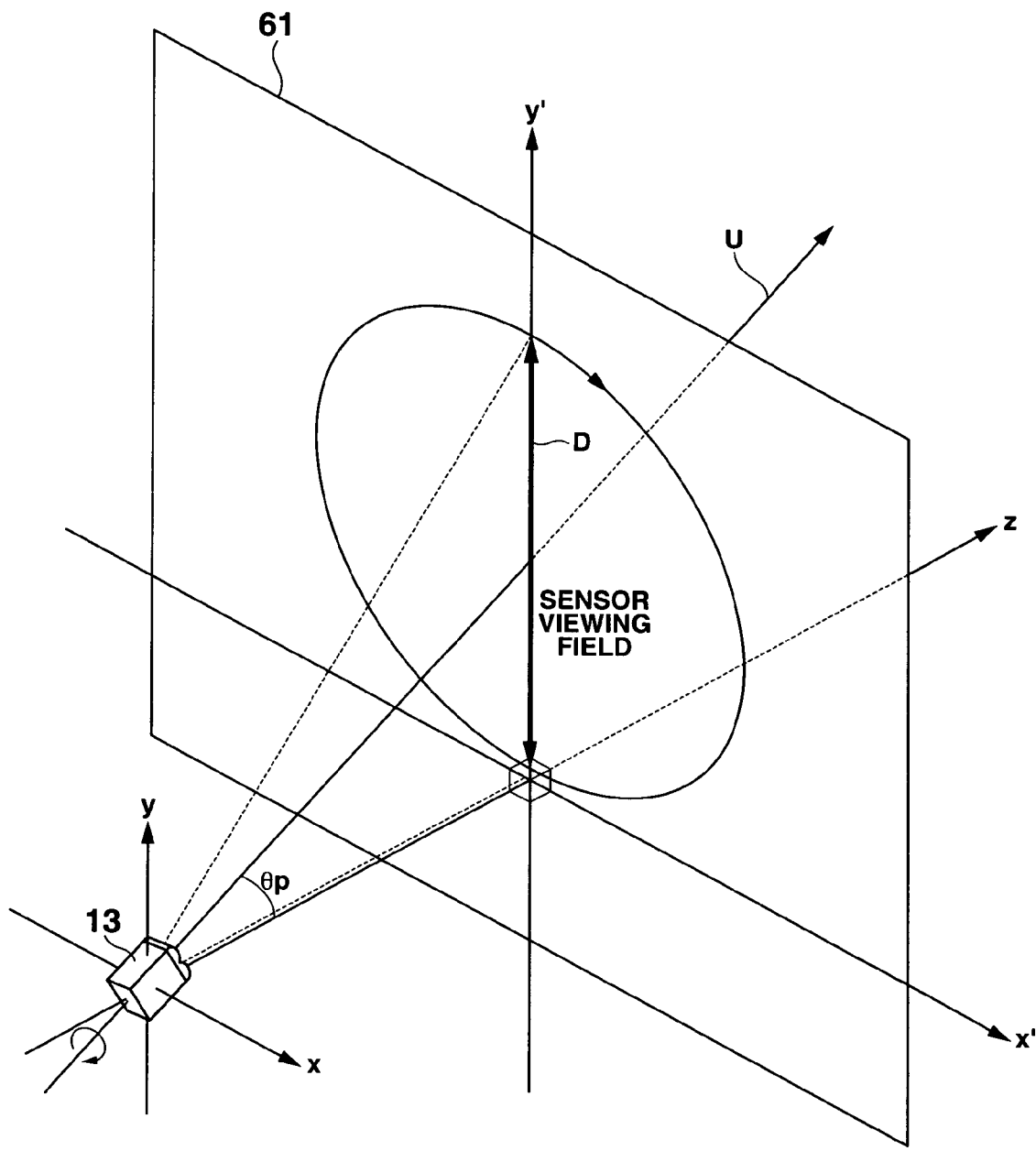
FIG. 7 is an illustration of a distance-measuring method in the projector according to the first embodiment of the present invention, which shows a relationship in position between the phase difference sensor and a target object.

FIG. 7 is an illustration of the distance-measuring method, which shows a relationship in position between the phase difference sensor 13 and the target object 61. In FIG. 7, θp represents the elevation angle of the sensor 13. In front projectors, usually, the value of the elevation angle is positive. The target object 61 is a screen.

The phase difference sensor 13 can be rotated on the sensor optical axis through the driving mechanism 51. Since the sensor 13 is supported to face the target object 61, the sensor optical axis coincides with the central axis U of the sensor viewing field D of the sensor 13. As the sensor 13 rotates on the sensor optical axis, the sensor arrangement direction varies and thus the sensor viewing field D of the sensor 13 toward the target object 61 rotates likewise. More specifically, the sensor 13 rotates 90° in the right direction toward the target object 61, as does the sensor viewing field D. The phase difference sensor 13 rotates 180°, as does the sensor viewing field D.

Figure 8A:
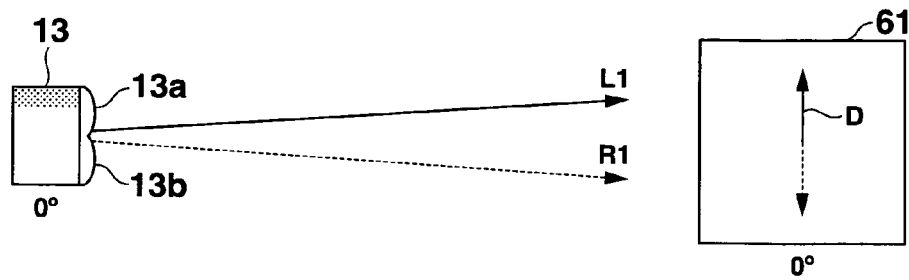
FIGS. 8A to 8D are side views of the phase difference sensor in the projector according to the first embodiment of the present invention, which shows a relationship between the rotation angle of the sensor and that of the viewing field thereof.
Figure 8B:
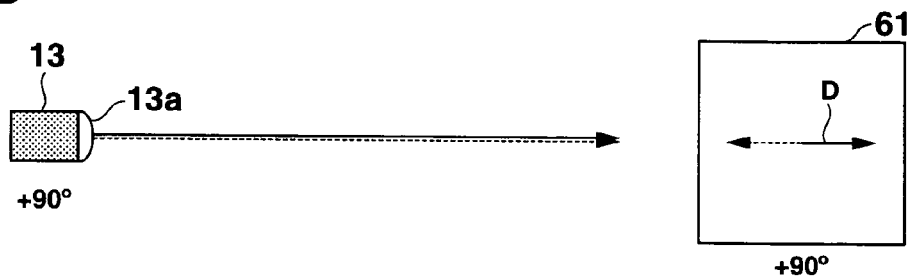
Figure 8C:
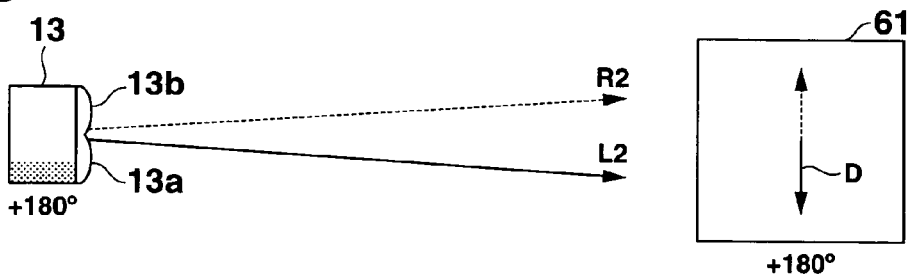
Figure 8D:
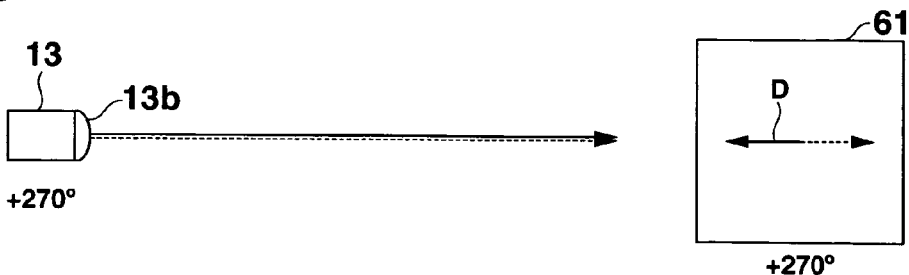

FIGS. 8A to 8D are side views of the phase difference sensor 13, which shows a relationship between the rotation angle of the sensor 13 and that of the sensor viewing field D. FIG. 8A shows the sensor 13 whose rotation angle is 0°, FIG. 8B shows the sensor 13 whose rotation angle is +90°, FIG. 8C shows the sensor 13 whose rotation angle is +180° and FIG. 8D shows the sensor 13 whose rotation angle is +270° and whose viewing angle is identical with the rotation angle.

In FIGS. 8A to 8D, the arrows attached to the phase difference sensor 13 each indicate a direction of distance measurement. In actuality, the target object 61 is irradiated with light from a light sender (not shown), and the light reflected by the object 61 is received by the sensor 13, thereby measuring the distance to the object 61 by the phase difference system.

Using the multi-point distance-measuring function of the phase difference sensor 13, the distance in the up-and-down direction (vertical direction) can be measured when the sensor viewing angle is 0° and +180°, and the distance in the right-and-left direction (horizontal direction) can be measured when the sensor viewing angle is +90° and +270°. The sensor viewing fields D are inverted each other when their sensor viewing angles are 0° and +180°, and they are inverted each other when their sensor viewing angles are +90° and +270°.

Assume that the distances measured when the rotation angle of the sensor 13 is 0° are L1 and R1 and the distances measured when the rotation angle of the sensor 13 is +180° are R2 and L2. The distance from the sensor 13 to the upper portion of the target object 61 is measured as the average of L1 and R2, and the distance from the sensor 13 to the lower portion of the target object 61 is measured as the average of R1 and L2.

As described above, the phase difference sensor 13 rotates 180° to change its viewing angle, and the values measured before and after the change of the viewing angle are averaged. Even though the ratio between the distances in the right-and-left direction and up-and-down direction measured by the phase difference sensor 13 varies with time and includes errors, the errors can be decreased to measure a correct distance.

The distance measurement according to the first embodiment will be described in detail with reference to FIGS. 9 and 10.

Figure 9:
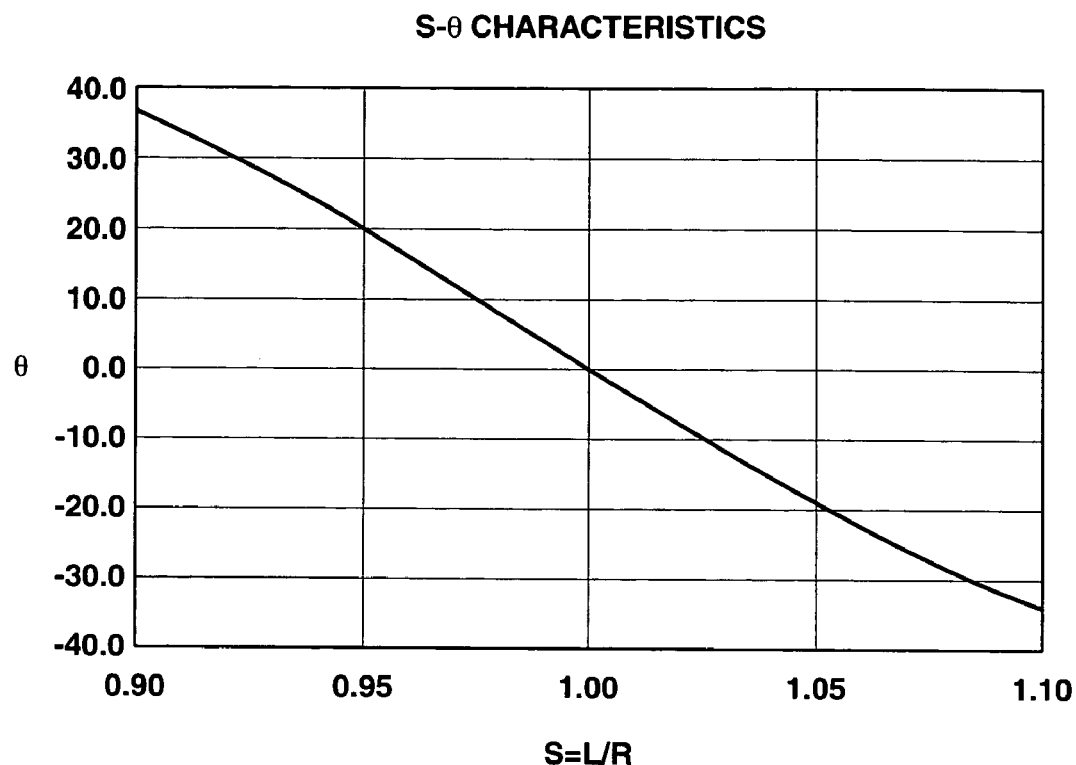
FIG. 9 is a graph illustrating a relationship between the ratio of distances measured by the phase difference sensor and the inclination angle of a target object in the projector according to the first embodiment of the present invention.

FIG. 9 is a graph illustrating a relationship between the ratio S (L/R) of distances measured by the phase difference sensor 13 and the inclination angle θ of the target object 61. In FIG. 9, W and cotW in the above equation (2) is 4° and 14.3. FIG. 10 is a sketch showing a measurement state before and after the rotation of the phase difference sensor 13.

Assuming that the ratio between distances L and R measured in the right-and-left (horizontal) or up-and-down (vertical) direction by the phase difference sensor 13 is S, S is equal to L/R. When S is 1.00, or when L and R are equal to each other as shown in FIG. 9, the inclination angle θ of the target object 61 is 0°. If L and R are different from each other, the target object 61 is inclined and its inclination angle θ is obtained by the above equation (2).

As has been described, the phase difference sensor 13 varies in characteristics and shape with time, and the ratio S between the measured distances L and R includes errors. The errors have an influence on the precision of detection of the inclination angle θ and a correct distance cannot be measured. Consequently, the distortion of an image projected by the projector 10 cannot be corrected with precision.

Figure 10:
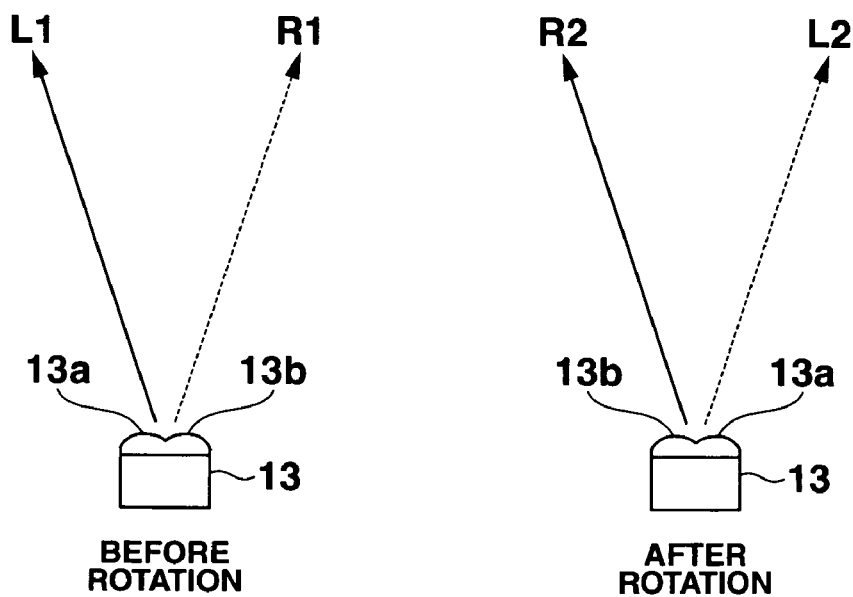
FIG. 10 is a sketch showing a measurement state before and after the rotation of the phase difference sensor in the projector according to the first embodiment of the present invention.

If the distances measured before the rotation of the phase difference sensor 13 are L1 and R1 and the distances measured after the rotation are R2 and L2 as shown in FIG. 10, the ratio S is given by the following equation (3). Thus, the errors due to variations in the shape of the sensor 13 with time are decreased and the inclination angle θ can be detected with higher precision.

$$S = \frac{L_1 + R_2}{R_1 + L_2} \quad (3)$$

An operation of processing an image projected by the projector 10 including the phase difference sensor 13 will be described.

Figure 11:
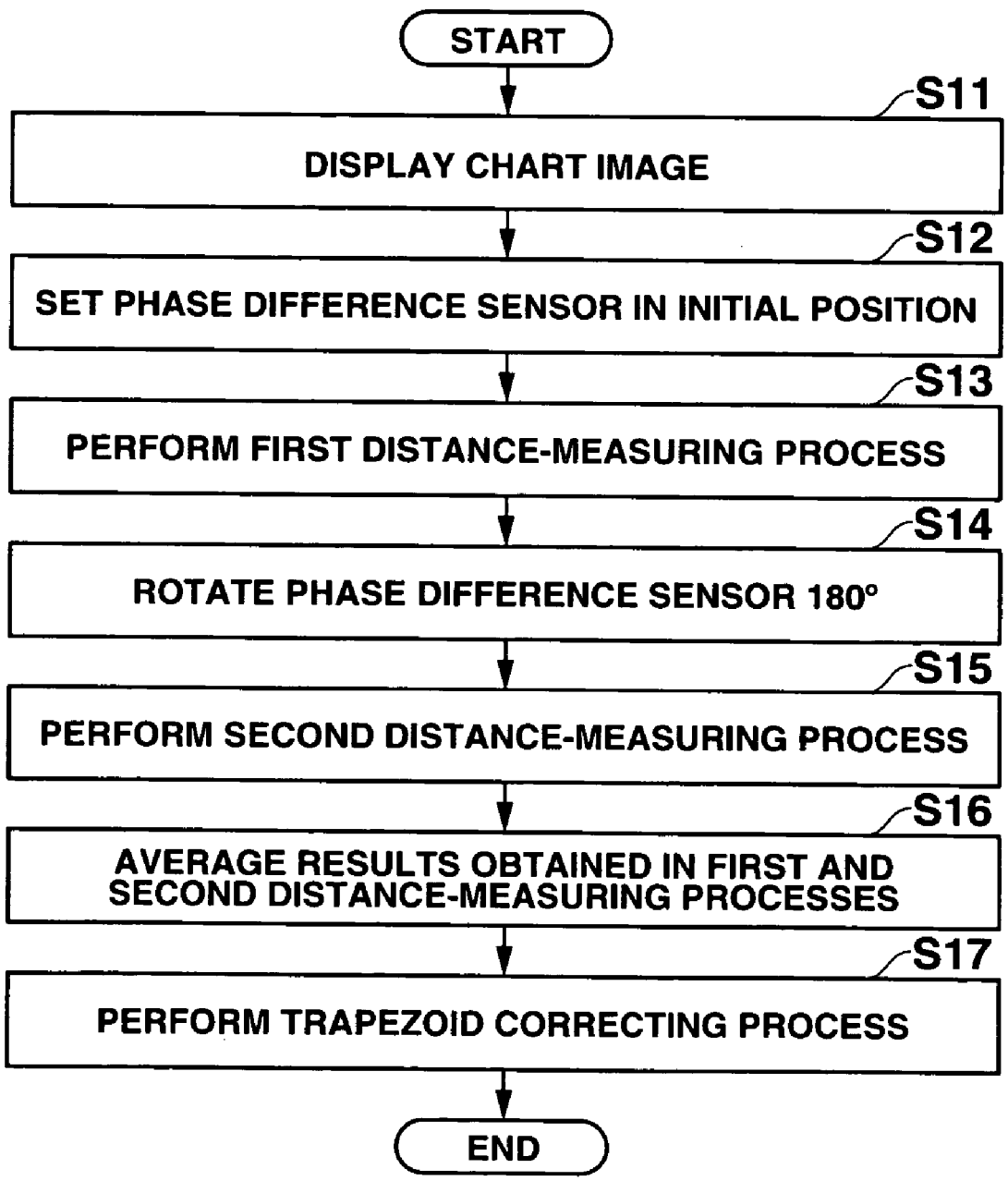
FIG. 11 is a flowchart showing an operation of processing an image projected by the projector according to the first embodiment of the present invention.

FIG. 11 is a flowchart of the above operation. The operation is performed when the CPU 391 of the control unit 39 serving as a microcomputer reads the programs of the ROM 392 of the CPU 391.

When an image is projected on a screen provided in front of the projector 10, the control unit 39 first causes a projection system including the projector lens 12 to project and display a chart image for distance measurement on the basis of the image data stored in the image storing unit 40 (step S11). The chart image includes a pattern image having, for example, black-and-white horizontal stripes. The reason why the chart image is displayed is that the screen is usually white only and thus the phase difference sensor 13 cannot read any measurement point.

Then, while the chart image is displayed, the control unit 39 gives an instruction to drive the driving control unit 52 shown in FIG. 3 and sets the phase difference sensor 13 in the initial position through the driving mechanism 51 (step S12). The initial position is a position in which the rotation angle of the sensor 13 is 0° as shown in FIG. 8(*a*).

When the phase difference sensor 13 is set in the initial position, the control unit 39 performs a first distance-measuring process through the distance-measurement processing unit 53 and measures distances L1 and R1 for the chart image (step S13). Data of the measured distances L1 and R1 is stored in a measured-distance storing unit 39*a* incorporated in the control unit 39.

Then, the control unit 39 gives an instruction to drive the driving control unit 52 shown in FIG. 3 to rotate the phase difference sensor 180° through the driving mechanism 51 and set the sensor at the rotation angle of +180° (step S14). With the rotation of the sensor, the viewing field D is inverted as shown in FIG. 8C.

Under the above condition, the control unit 39 performs a second distance-measuring process through the distance-measurement processing unit 53 to measure distances R2 and L2 for the chart image (step S15). Data of the measured distances R2 and L2 is stored in the measured-distance storing unit 39*a*.

If the phase difference sensor 13 rotates 180° to perform two distance-measuring processes as described above, the control unit 39 reads data of measured distances L1 and R1 and data of measured distances R2 and L2 from the measured-distance storing unit 39*a* and averages both the data to obtain the final distance data (step S16).

Using the final distance data, the control unit 39 computes inclination angle θ of the projection plane of the screen with respect to the optical axis in accordance with the above equation (2) (step S17). In this case, L=(L1+R2)/2 and R=(L2+R1)/2, and the ratio S between L and R has the value given by the above equation (3).

The control unit 39 performs a trapezoid correcting process for a projected image on the basis of the inclination angle θ obtained in step S16 (step S17). More specifically, the control unit 39 computes an angle necessary for trapezoid correction to determine which direction and how many angles the projection plane of the screen is inclined and to form the screen as a rectangle having a proper aspect ratio that is the same as that of a projected image. The display encoder 33 corrects the ratio of the upper side to the lower side of image data expanded and stored in the video RAM 34 and the ratio of the right side to the left side thereof. In step S17, the inclination angle only in the vertical direction is obtained; therefore, the ratio of the upper side to the lower side of image data is corrected based on the inclination angle θ as trapezoid correction.

As described above, the phase difference sensor 13 rotates 180° on the sensor optical axis to change the viewing angle of the sensor 13, and the distances measured before and after the change of the viewing angle are averaged to obtain a correct distance. In the projector 10, trapezoid correction is performed by detecting the inclination angle of a projected image using the obtained distance. The distortion of the image can be corrected and the image can clearly be formed rectangularly.

In the foregoing embodiment, the average of measured distances is obtained. However, the average of phase differences can be obtained.

With the phase difference sensor 13, the inclination angle in the horizontal direction as well as in the vertical direction can be detected. As shown in FIGS. 8B and 8D, the distance measured at the sensor rotation angle of +90° and the distance measured at that of +270° after the rotation of the sensor have only to be averaged.

Second Embodiment

A second embodiment of the present invention will be described.

In the first embodiment, the phase difference sensor itself is rotated. In the second embodiment, an optical member is provided in front of a phase difference sensor and rotated to rotate the sensing range (change the viewing angle) of the sensor. The optical member is a Dove prism.

Since the circuit arrangement and data processing of a projector 10 of the second embodiment are basically the same as those of the projector of the first embodiment, their descriptions are omitted.

Figure 12:
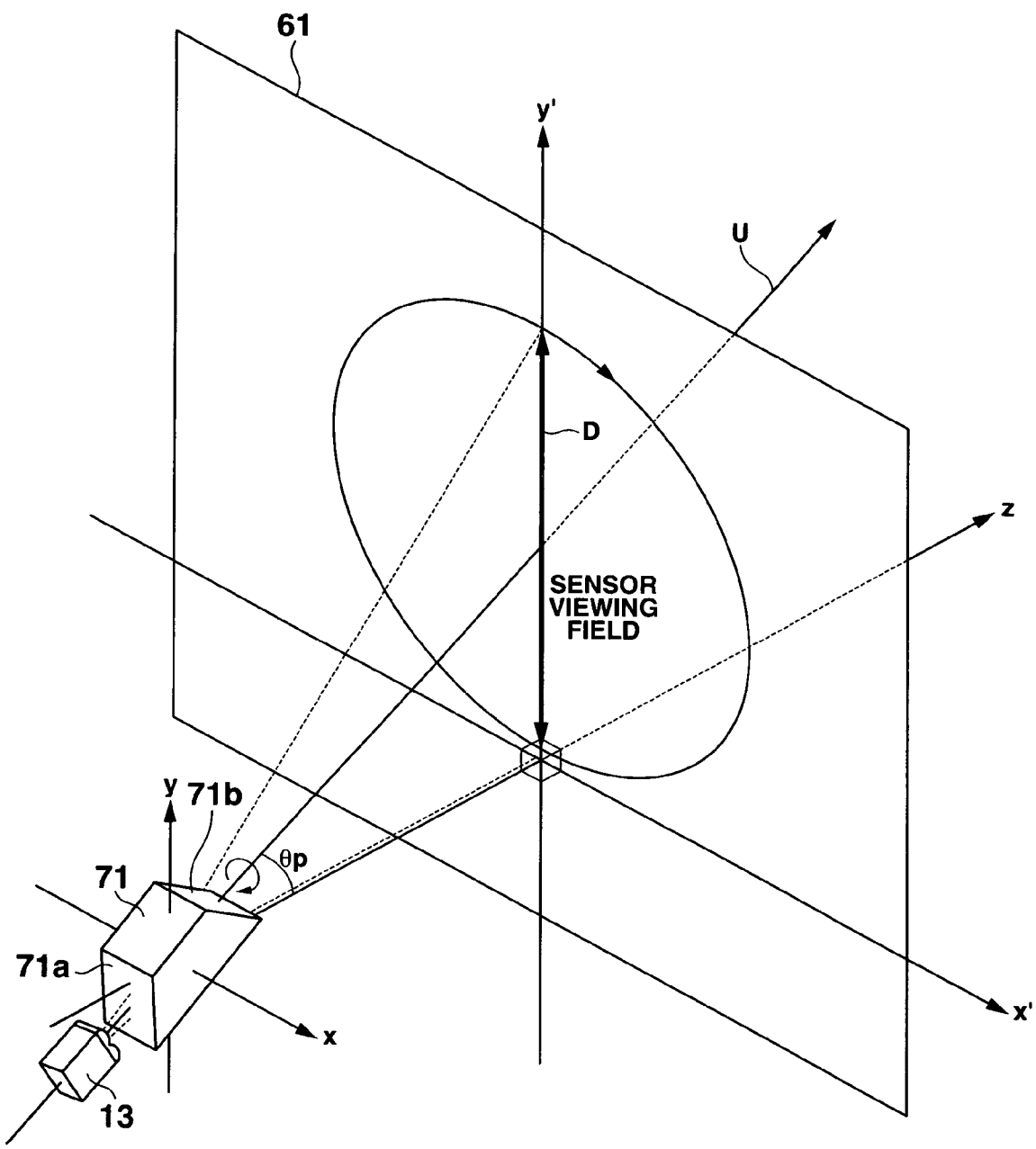
FIG. 12 is an illustration of a distance-measuring method in a projector according to the second embodiment of the present invention, which shows a relationship in position among a phase difference sensor, an optical member and a target object.

FIG. 12 is an illustration of a distance-measuring method according to the second embodiment, which shows a relationship in position among the phase difference sensor, optical member and a target object. In FIG. 12, θp indicates an elevation angle of a phase difference sensor 13 and its value is usually positive in front projectors. A target object 61 is a screen.

The phase difference sensor 13 is fixed and arranged longitudinally in a main casing 11 of the projector 10. A Dove prism 71 is provided in front of the sensor 13. The Dove prism 71 is also called an image rotating prism. When the prism rotates, an image that is transmitted through the prism rotates at speeds two times faster. The light incident at the incidence angle of 45° is all reflected by the bottom of the prism and transmitted through the prism.

In the second embodiment, the Dove prism 71 has a first surface 71*a* that faces the phase difference sensor 13 and a second surface 71*b* that faces the target object 61, and rotates at least 180° on the sensor optical axis. As in the first embodiment, the sensor 13 is supported to face the target object 61 and thus the sensor optical axis coincides with the central axis U of the viewing field of the sensor 13.

A mechanism for driving the Dove prism 71 is not shown in particular but includes a motor, a worm gear coupled to the shaft of the motor and a link gear engaged with the worm gear to rotate the Dove prism 71.

As the Dove prism 71 rotates in the right or left direction on the sensor optical axis, the sensor viewing field D for the target object 61 rotates in the same direction. However, the rotation angle of the sensor viewing field D is two times as large as that of the Dove prism 71. The variations of the rotation angles are shown in FIGS. 13A to 13D.

Figure 13A:
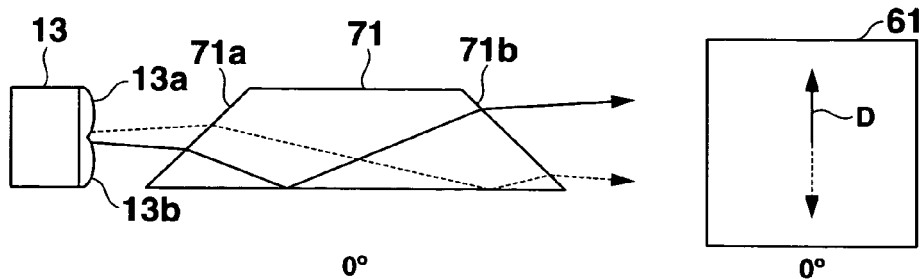
FIGS. 13A to 13D are side views of the phase difference sensor and its surroundings in the projector according to the second embodiment of the present invention, which shows a relationship between the rotation angle of a Dove prism and the viewing angle of the sensor.
Figure 13B:
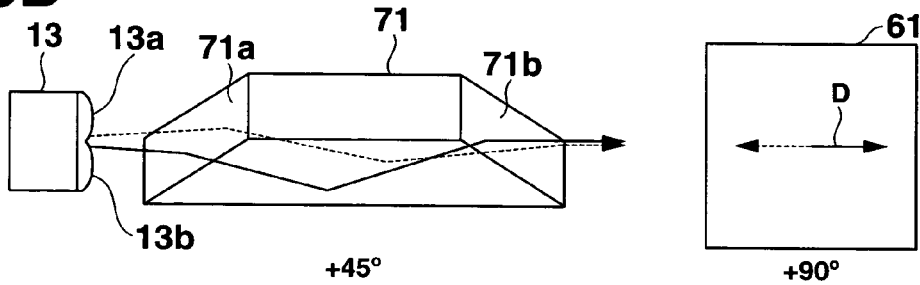
Figure 13C:
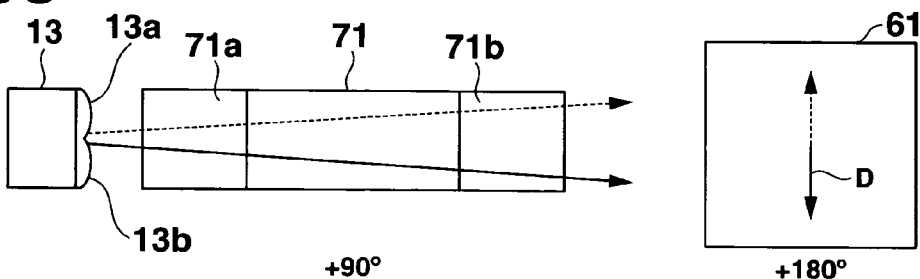
Figure 13D:
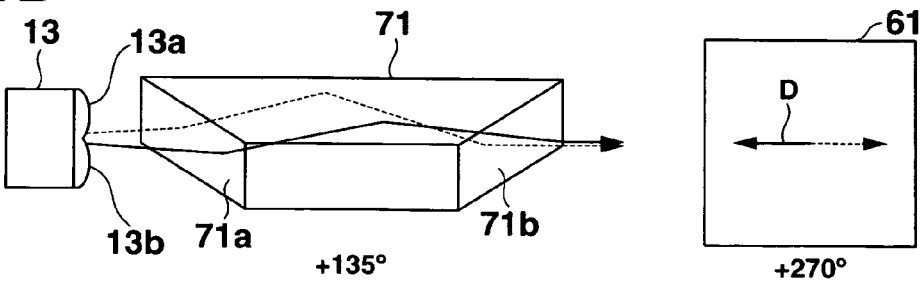

FIGS. 13A to 13D are side views of the phase difference sensor 13 and its surroundings, which shows a relationship between the rotation angle of the Dove prism 71 and that of the sensor viewing field D. FIG. 13A shows the Dove prism 71 whose rotation angle is 0°, FIG. 13B shows the Dove prism 71 whose rotation angle is +45°, FIG. 13C shows the Dove prism 71 whose rotation angle is +90° and FIG. 13D shows the Dove prism 71 whose rotation angle is +135°.

In FIGS. 13A to 13D, the arrows attached to the phase difference sensor 13 each indicate a direction of distance measurement. In actuality, as described in FIG. 4, the target object 61 is irradiated with light from a light sender (not shown), and the light reflected by the object 61 is received by the sensor 13 through the Dove prism 71, thereby measuring the distance to the object 61 by the phase difference system.

With the above configuration, if the Dove prism 71 is rotated with the phase difference sensor 13 fixed, the sensor viewing field can be varied at speeds two times faster by the optical characteristics of the Dove prism 71. If, therefore, the rotation angle of the Dove prism 71 is controlled and the sensor viewing field is inverted to perform distance measurement two times, errors due to variations in the characteristics of the sensor 13 can be decreased and the inclination angle θ can be detected with higher precision as in the first embodiment.

More specifically, in order to obtain the inclination of the target object 61 in the vertical direction, the Dove prism 71 is set at an angle of 0° and an angle of +90° to measure the distance between two points on the vertical line of the target object 61 as shown in FIGS. 13A and 13C. The average of the distance measured at the angle of 0° and the distance measured at the angle of +90° has only to be used as the final measurement-distance result to obtain the inclination angle.

Similarly, in order to obtain the inclination of the target object 61 in the horizontal direction, the Dove prism 71 is set at an angle of +45° and an angle of +135° to measure the distance between two points on the horizontal line of the target object 61 as shown in FIGS. 13B and 13D. The average of the distance measured at the angle of +45° and the distance measured at the angle of +135° has only to be used as the final measurement-distance result to obtain the inclination angle.

In FIGS. 13A to 13D, the Dove prism 71 is set at angles of 0°, +45°, +90° and +135°. However, it can rotate 45° and set at angles of 180°, +225°, +270° and +315° to measure a distance.

At the angles of 0° and 180°, the Dove prism 71 faces in different directions, but the sensor viewing field D faces in the same direction. Similarly, at the angles of +45° and +225°, the angles of +90° and +270°, and the angles of +135° and +315°, the Dove prism 71 faces in different directions, but the sensor viewing field D faces in the same direction.

If, therefore, an average of distances measured at the above angles is obtained, errors in measurement due to an error caused when the Dove prism 71 is manufactured and mounted, a displacement of rotation, etc. can be decreased.

Third Embodiment

A third embodiment of the present invention will be described.

In the third embodiment, an optical system group including a pair of right-angle mirrors, a half mirror and a light absorption member is provided around a phase difference sensor to change the viewing angle of the sensor for a target object.

Figure 14:
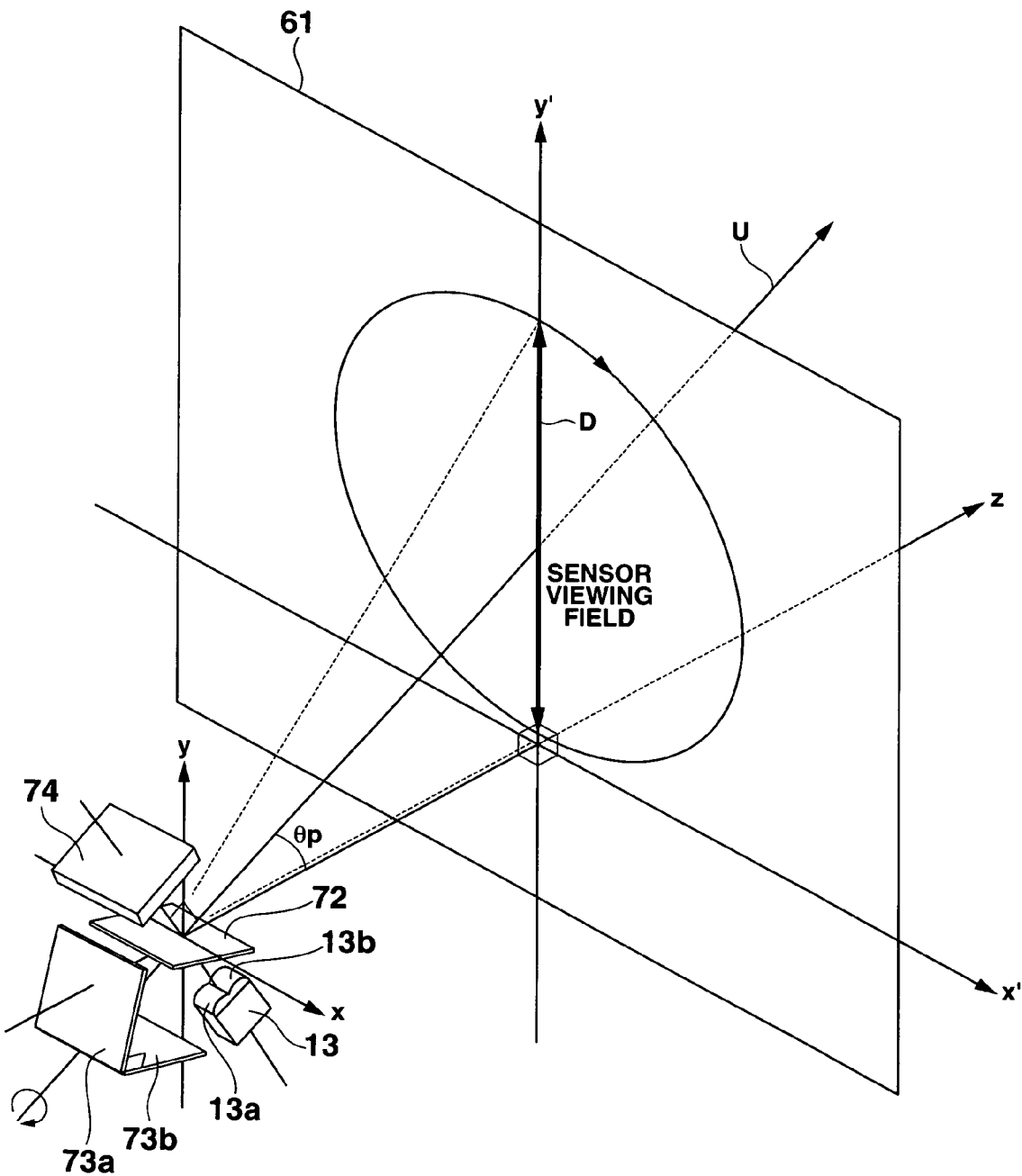
FIG. 14 is an illustration of a distance-measuring method in a projector according to a third embodiment of the present invention, which shows a relationship in position among a phase difference sensor, an optical system group and a target object.

FIG. 14 is an illustration of a distance-measuring method according to the third embodiment of the present invention, which shows a relationship in position among a phase difference sensor 13, an optical system group and a target object 61. In FIG. 14, θp indicates an elevation angle of the phase difference sensor 13 and its value is usually positive in front projectors. The target object 61 is a screen.

The phase difference sensor 13 is fixed and arranged longitudinally in a main casing 11 of a projector 10. As optical members for changing the viewing angle of the phase difference sensor 13, a half mirror 72, a pair of right-angle mirrors 73a and 73b and a light absorption member 74 are arranged around the phase difference sensor 13.

The half mirror 72 is provided at an intersection of the sensor optical axis and the central axis U of a sensor viewing field for the target object 61 and inclined at an angle of 45° toward the phase difference sensor 13. The direction that crosses the sensor optical axis at right angles is equal to the direction of the central axis U. The pair of right-angle mirrors 73a and 73b is a combination of reflecting mirrors that are square and have their reflecting surfaces inside. The right-angle mirrors 73a and 73b are arranged toward the target object 61 with the half mirror 72 therebetween. The light absorption member 74 prevents light from leaking to outside and is provided above the back of the half mirror 72.

In the third embodiment, the pair of right-angle mirrors 73a and 73b is arranged toward the target object 61 with the half mirror therebetween and supported to rotate at least 180° around the central axis U of the sensor viewing field. A mechanism for driving the pair of right-angle mirrors 73a and 73b is not shown in particular but includes a motor, a worm gear coupled to the shaft of the motor and a link gear engaged with the worm gear to rotate the pair of right-angle mirrors 73a and 73b.

As the pair of right-angle mirrors 73a and 73b rotates in the right or left direction around the central axis U of the sensor viewing field D, the sensor viewing field D for the target object 61 rotates in the same direction. However, the rotation angle of the sensor viewing field D is two times as large as that of the pair of right-angle mirrors 73a and 73b. The variations of the rotation angles are shown in FIGS. 15A to 15D.

Figure 15A:
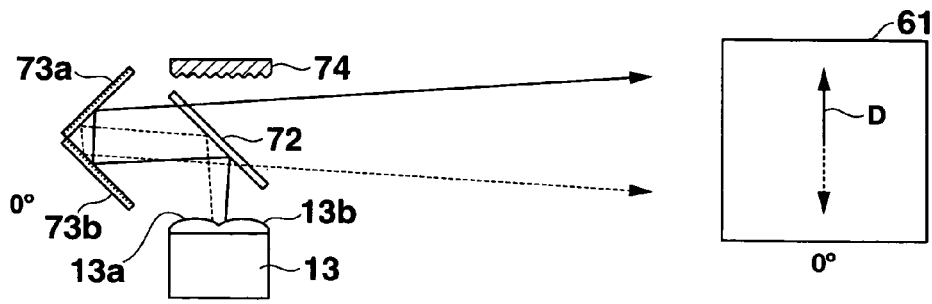
FIGS. 15A to 15D are side views of the phase difference sensor and its surroundings in the projector according to the third embodiment of the present invention, which shows a relationship between the rotation angle of a pair of right-angle mirrors and the viewing angle of the sensor.
Figure 15B:
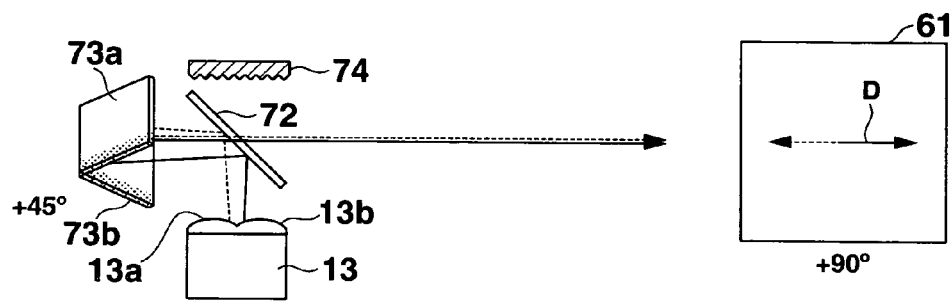
Figure 15C:
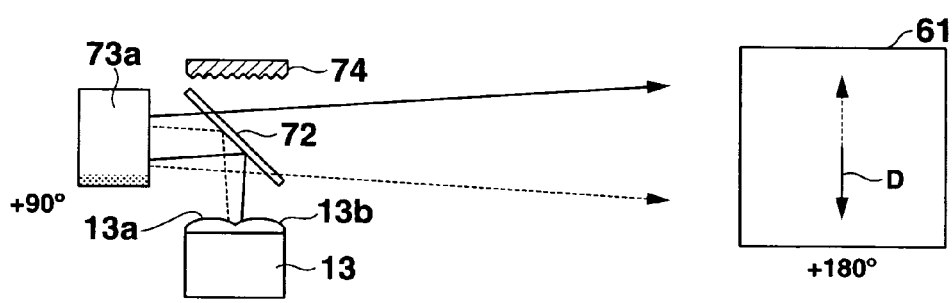
Figure 15D:
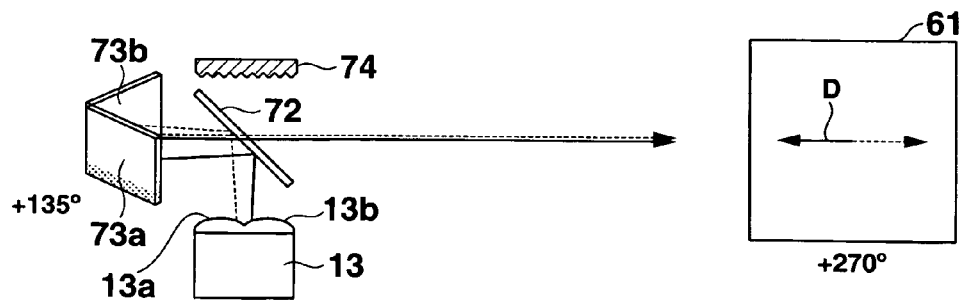

FIGS. 15A to 15D are side views of the phase difference sensor 13 and its surroundings, which shows a relationship between the rotation angle of the pair of right-angle mirrors 73a and 73b and that of the sensor viewing field D. FIG. 15A shows the pair of right-angle mirrors 73a and 73b whose rotation angle is 0°, FIG. 15B shows the pair of right-angle mirrors 73a and 73b whose rotation angle is +45°, FIG. 15C shows the pair of right-angle mirrors 73a and 73b whose rotation angle is +90° and FIG. 15D shows the pair of right-angle mirrors 73a and 73b whose rotation angle is +135°.

In FIGS. 15A to 15D, the arrows attached to the phase difference sensor 13 each indicate a direction of distance measurement. In actuality, as described in FIG. 4, the target object 61 is irradiated with light from a light sender (not shown), and the light reflected by the object 61 is received by the sensor 13 through the half mirror 72 and pair of right-angle mirrors 73a and 73b, thereby measuring the distance to the object 61 by the phase difference system.

With the above configuration, if the pair of right-angle mirrors 73a and 73b is rotated with the phase difference sensor 13 fixed, the sensor viewing field can be varied at speeds two times faster by the optical characteristics of the half mirror 72 and pair of right-angle mirrors 73a and 73b. If, therefore, the rotation angle of the pair of right-angle mirrors 73a and 73b is controlled and the sensor viewing field is inverted to perform distance measurement two times, errors due to variations in the characteristics of the sensor 13 can be decreased and the inclination angle θ can be detected with higher precision as in the first embodiment.

More specifically, in order to obtain the inclination of the target object 61 in the vertical direction, the pair of right-angle mirrors 73a and 73b is set at an angle of 0° and an angle of +90° to measure the distance between two points on the vertical line of the target object 61 as shown in FIGS. 15A and 15C. The average of the distance measured at the angle of 0° and the distance measured at the angle of +90° has only to be used as the final measurement-distance result to obtain the inclination angle.

Similarly, in order to obtain the inclination of the target object 61 in the horizontal direction, the pair of right-angle mirrors 73a and 73b is set at an angle of +45° and an angle of +135° to measure the distance between two points on the horizontal line of the target object 61 as shown in FIGS. 15B and 15D. The average of the distance measured at the angle of +45° and the distance measured at the angle of +135° has only to be used as the final measurement-distance result to obtain the inclination angle.

MODIFICATIONS

Modifications to the third embodiment of the present invention will be described with reference to FIGS. 16A to 16E. In these figures, the arrows each show the central axis of the sensor viewing field.

Figure 16A:
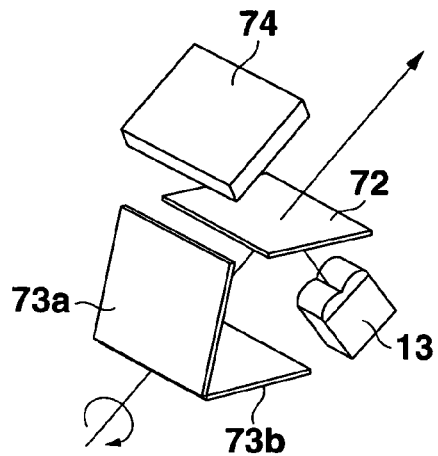
FIGS. 16A to 16E are sketches of modifications to the third embodiment of the present invention.

The configuration shown in FIG. 16A is the same as that shown in FIGS. 15A to 15D. More specifically, a half mirror 72, a pair of right-angle mirrors 73a and 73b and a light absorption member 74 are arranged around a phase difference sensor 13, and the pair of right-angle mirrors 73a and 73b is rotated around the central axis of the sensor viewing field.

With the configuration shown in FIG. 16A, the apparatus can be decreased in size more than the apparatus using a Dove prism as in the second embodiment.

Figure 16B:
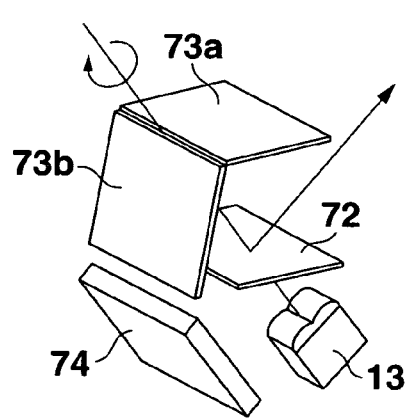

In the configuration shown in FIG. 16B, the pair of right-angle mirrors 73a and 73b and the light absorption member 74 are displaced to each other. More specifically, the direction that crosses the sensor optical axis at right angles is set equal to the direction of the sensor viewing field, and the half mirror 72 is provided at an intersection of the sensor optical axis and the central axis of the sensor viewing field. The pair of right-angle mirrors 73a and 73b is provided toward the phase difference sensor 13 with the half mirror 72 therebetween. In this case, the relationship between the reflection and transmission of the half mirror 72 is opposite to that in the configuration shown in FIG. 16A.

With the configuration shown in FIG. 16B, the driving mechanism (e.g., a motor) of the pair of right-angle mirrors 73a and 73b can be arranged as shown in FIG. 16B in consideration of the arrangement of devices in the apparatus.

Figure 16C:
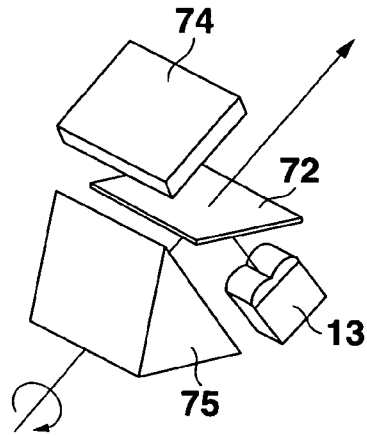

In the configuration shown in FIG. 16C, a right-angle prism mirror 75 is used in place of the pair of right-angle mirrors 73a and 73b shown in FIG. 16A. More specifically, the direction that crosses the sensor optical axis at right angles is set equal to the direction of the sensor viewing field, and the half mirror 72 is provided at an intersection of the sensor optical axis and the central axis of the sensor viewing field. The right-angle prism mirror 75 is provided toward a target object with the half mirror 72 therebetween and rotated around the central axis of the sensor viewing field.

With the configuration shown in FIG. 16C, the precision of reflection in a direction at right angles can be increased more than that in the configuration using the pair of right-angle mirrors 73a and 73b.

Figure 16D:
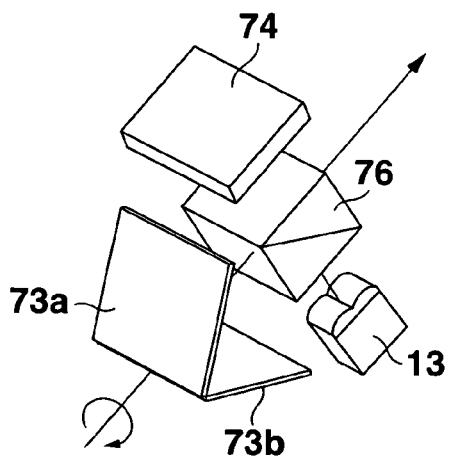

In the configuration shown in FIG. 16D, a cubic beam splitter 76 is used in place of the half mirror 72 shown in FIG. 16A. More specifically, the direction that crosses the sensor optical axis at right angles is set equal to the direction of the sensor viewing field, and the cubic beam splitter 76 is provided at an intersection of the sensor optical axis and the central axis of the sensor viewing field. The cubic beam splitter 76 is formed by bonding two right-angle prisms whose inclined surfaces are partly covered with coating. The right-angle mirrors 73a and 73b are provided toward a target object with the cubic beam splitter 76 therebetween.

Since the half mirror 72 is thick, light is reflected by both the surface and back thereof. In the cubic beam splitter 76, however, light is reflected only by the interface between two right-angle prisms. Therefore, even though the right-angle mirrors 73a and 73b are rotated, light can be reflected in a given direction to measure a correct distance.

Figure 16E:
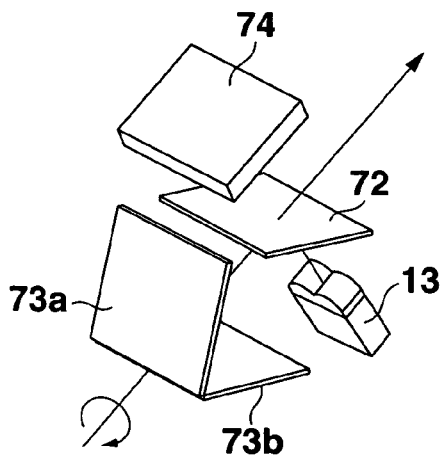

In the configuration shown in FIG. 16E, the phase difference sensor 13 shown in FIG. 16A is rotated 90°. This angle can be changed to 45°, 22.5° or the like if it has only to match the rotation angle of the pair of right-angle mirrors 73a and 73b.

With the configuration shown in FIG. 16E, even though errors in measurement are caused by optical members, they can be reduced by changing the direction of the phase difference sensor 13 around the optical axis.

The above modifications can be combined appropriately. For example, in the configurations shown in FIGS. 16B, 16C and 16D, the direction of the phase difference sensor as shown in FIG. 16E can be changed around the optical axis.

According to the present invention described above, the viewing angle of the phase difference sensor can be changed and the final distance data is computed using the results of distance measurement obtained before and after the change in the viewing angle. Errors due to variations in the characteristics of the phase difference sensor can be decreased to obtain a correct measurement result. If the present invention is a projector, it can detect the inclination angle of a projected image correctly and correct the distortion of the projected image exactly.

If the phase difference sensor itself is configured to rotate on the sensor optical axis as in the first embodiment, its viewing angle can be changed without interposing any optical member. The design and structure of the apparatus can thus be simplified.

If an optical member is provided in front of the phase difference sensor and rotated around the central axis of the sensor viewing field as in the second embodiment, the viewing angle can be changed with the sensor fixed. It is thus possible to prevent a decrease in the precision of distance measurement that is caused by a displacement of the sensor due to a shock or the like.

If a Dove prism is used as the above optical member, the sensor viewing angle can be varied two times faster than the prism rotation angle. The rotation efficiency of the apparatus can thus be improved.

Even when a combination of optical members such as a half mirror and a pair of right-angle mirrors is arranged around the phase difference sensor as in the third embodiment, the viewing angle of the sensor can be changed with the sensor fixed. In this case, as has been described, the configurations shown in FIGS. 16A to 16E bring the following advantages:

In the configuration shown in FIG. 16A, the apparatus can be decreased in size more than the apparatus using a Dove prism.

In the configuration shown in FIG. 16B, the driving mechanism such as a motor can be provided in consideration of the arrangement of devices in the apparatus.

In the configuration shown in FIG. 16C, the precision of reflection in a direction at right angles can be increased.

In the configuration shown in FIG. 16D, correct distance measurement can be performed by reflecting light in a given direction.

In the configuration shown in FIG. 16E, errors in distance measurement due to optical members can be reduced.

In the first to third embodiments, the present invention is described taking a projector as an example. The present invention is not limited to the projector but can be applied to not only an imaging apparatus such as a digital camera but also all apparatuses that require a distance-measuring process and, in this case, too, the same advantages can be obtained.

Figure 17:
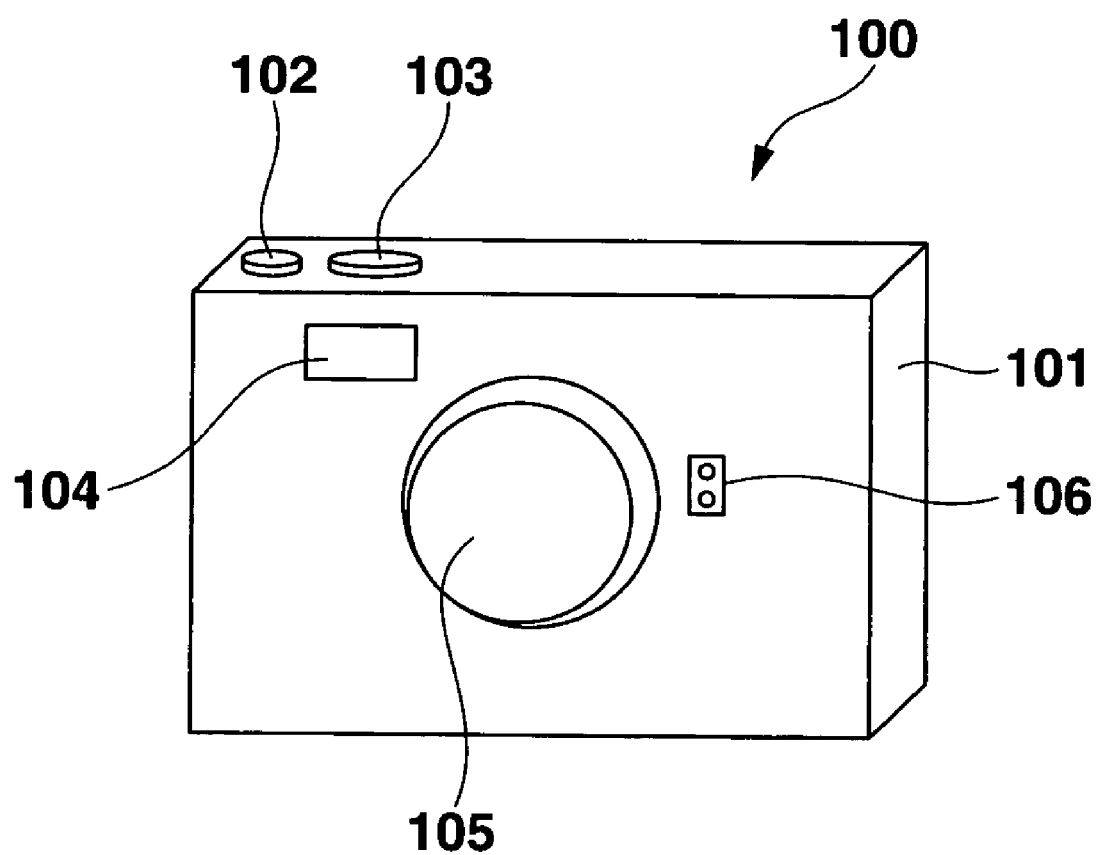
FIG. 17 is a sketch showing a digital camera to which the distance-measuring apparatus of the present invention is applied.

FIG. 17 shows an example of the present invention that is applied to a digital camera. In FIG. 17, reference numeral 100 indicates a small-sized digital camera. The camera 100 has various operation keys such as a power key 102 and a shutter key 103 on the top of a camera main body 101. The camera 100 also has an optical finder window 104 and a picture-taking lens 105 on the front of the camera main body 101.

A single phase difference sensor 106 is provided close to the picture-taking lens 105. The viewing angle of the sensor 106 can be changed using any one of the techniques of the first to third embodiments described above. The digital camera so configured performs multi-point distance measurement using the phase difference sensor 106, and a focusing process is performed on the basis of distances to respective measurement points.

What is claimed is:

1. A distance-measuring apparatus comprising:
   a phase-difference sensor which includes at least two photodetectors arranged in line, and which measures a distance to a target object using a phase difference system;
   a rotation unit which rotates the phase difference sensor on a sensor optical axis as a rotational axis, the sensor optical axis being a straight line which extends in a measurement direction from a center of the phase difference sensor and which is perpendicular to a line direction in which the photodetectors are arranged; and
   a computation unit which computes, as distance data, an average value of measurement results obtained by the phase difference sensor, the measurement results including at least a measurement result obtained when the phase difference sensor is in a first measurement position and a measurement result obtained when the phase difference sensor is in a second measurement position defined by rotating the phase difference sensor 180° from the first measurement position.

2. The distance-measuring apparatus according to claim 1, wherein the computation unit computes, as distance data, an average value of measurement results obtained by the phase difference sensor, the measurement results including a measurement result obtained when the phase difference sensor is in a third measurement position defined by rotating the phase difference sensor 90° from the first measurement position and a measurement result obtained when the phase difference sensor is in a fourth measurement position defined by rotating the phase difference sensor 270° from the first measurement position.

3. The distance-measuring apparatus according to claim 1, further comprising an optical member provided in front of the phase difference sensor,
   wherein the rotation unit defines the measurement positions of the phase difference sensor by rotating the optical member around the sensor optical axis as a rotational axis with the phase difference sensor facing the target object.

4. The distance-measuring apparatus according to claim 3, wherein the optical member is a Dove prism.

5. The distance-measuring apparatus according to claim 1, further comprising:
   a half mirror provided at an intersection between the sensor optical axis and a central axis of a sensor viewing field for the target object and inclined at a given angle, a direction that crosses the sensor optical axis at right angles being equal to a direction of the central axis; and
   a pair of right-angle mirrors arranged toward the target object with the half mirror therebetween,
   wherein the rotation unit defines the measurement positions of the phase difference sensor by rotating the pair of right-angle mirrors around the central axis of the sensor viewing field.

6. The distance-measuring apparatus according to claim 5, wherein the phase difference sensor is rotated on the sensor optical axis by a given angle.

7. The distance-measuring apparatus according to claim 1, further comprising:
   a half mirror provided at an intersection between the sensor optical axis and a central axis of a sensor viewing field for the target object and inclined at a given angle, a direction that crosses the sensor optical axis at right angles being equal to a direction of the central axis; and
   a pair of right-angle mirrors arranged toward the phase difference sensor with the half mirror therebetween,
   wherein the rotation unit defines measurement positions of the phase difference sensor by rotating the pair of right-angle mirrors around the sensor optical axis.

8. The distance-measuring apparatus according to claim 7, wherein the phase difference sensor is rotated on the sensor optical axis by a given angle.

9. The distance-measuring apparatus according to claim 1, further comprising:
   a half mirror provided at an intersection between the sensor optical axis and a central axis of a sensor viewing field for the target object and inclined at a given angle, a direction that crosses the sensor optical axis at right angles being equal to a direction of the central axis; and
   a right-angle prism mirror arranged toward the target object with the half mirror therebetween,
   wherein the rotation unit defines the measurement positions of the phase difference sensor by rotating the right-angle prism mirror around the central axis of the sensor viewing field.

10. The distance-measuring apparatus according to claim 9, wherein the phase difference sensor is rotated on the sensor optical axis by a given angle.

11. The distance-measuring apparatus according to claim 1, further comprising:
    a cubic beam splitter provided at an intersection between the sensor optical axis and a central axis of a sensor viewing field for the target object, a direction that crosses the sensor optical axis at right angles being equal to a direction of the central axis; and
    a right-angle prism mirror arranged toward the target object with the cubic beam splitter therebetween,
    wherein the rotation unit defines the measurement positions of the phase difference sensor by rotating the right-angle prism mirror around the central axis of the sensor viewing field.

12. The distance-measuring apparatus according to claim 11, wherein the phase difference sensor is rotated on the sensor optical axis by a given angle.

13. A projecting apparatus using the distance-measuring apparatus claimed in claim 1.

14. An imaging apparatus using the distance-measuring apparatus claimed in claim 1.

15. A distance-measuring method comprising:
    performing a first measurement process of measuring a distance to a target object in a first measurement position using a phase difference sensor by a phase difference system, the phase difference sensor including at least two photodetectors arranged in line;
    rotating the phase difference sensor on a sensor optical axis as a rotational axis, the sensor optical axis being a straight line which extends in a measurement direction from a center of the phase difference sensor and which is perpendicular to a line direction in which the photodetectors are arranged;
    performing a second measurement process of measuring a distance to the target object in a second measurement position using the phase difference sensor, the second measurement position being defined by rotating the phase difference sensor 180° from the first measurement position; and computing, as distance data, an average value of at least a measurement result obtained in the first measurement process and a measurement result obtained in the second measurement process.

16. A computer-readable recording medium having a program recorded thereon for controlling a computer to perform functions comprising:

performing a first measurement function of measuring a distance to a target object in a first measurement position using a phase difference sensor by a phase difference system, the phase difference sensor including at least two photodetectors arranged in line;

rotating the phase difference sensor on a sensor optical axis as a rotational axis, the sensor optical axis being a straight line which extends in a measurement direction from a center of the phase difference sensor and which is perpendicular to a line direction in which the photodetectors are arranged;

performing a second measurement process of measuring a distance to the target object in a second measurement position using the phase difference sensor, the second measurement position being defined by rotating the phase difference sensor 180° from the first measurement position; and computing, as distance data, an average value of at least a measurement result obtained in the first measurement process and a measurement result obtained in the second measurement process.

* * * * *